(12) United States Patent
Yamakawa

(10) Patent No.: US 6,593,559 B2
(45) Date of Patent: Jul. 15, 2003

(54) IMAGE READOUT APPARATUS AND IMAGE READOUT METHOD USING THE SAME

(75) Inventor: Hiromitsu Yamakawa, Omiya (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 71 days.

(21) Appl. No.: 09/739,664

(22) Filed: Dec. 20, 2000

(65) Prior Publication Data

US 2001/0007346 A1 Jul. 12, 2001

(30) Foreign Application Priority Data

Jan. 12, 2000 (JP) ........................................ 2000-003571

(51) Int. Cl.[7] .............................. H01L 27/00; H04N 1/86
(52) U.S. Cl. ..................... 250/208.1; 348/375; 358/483
(58) Field of Search .......................... 250/208.1, 208.2; 358/474, 482, 512, 483; 257/234; 382/312, 323; 348/275, 294

(56) References Cited

U.S. PATENT DOCUMENTS

| | | | | |
|---|---|---|---|---|
| 4,918,506 A | * | 4/1990 | Dyck ........................ | 250/578.1 |
| 5,055,921 A | * | 10/1991 | Usui .......................... | 348/272 |
| 6,005,689 A | * | 12/1999 | Miyasaka ................... | 348/274 |
| 6,009,214 A | * | 12/1999 | Suggs ........................ | 348/302 |
| 6,137,100 A | * | 10/2000 | Fossum et al. .......... | 250/208.1 |

* cited by examiner

*Primary Examiner*—Stephone Allen
(74) *Attorney, Agent, or Firm*—Snider & Associates; Ronald R. Snider

(57) ABSTRACT

In an image readout apparatus comprising a light source for illuminating an original, a linearly arranged light-receiving device array, and an imaging lens for forming an image of the original illuminated with the light source onto the light-receiving device array; a plurality of light-receiving device arrays having respective pixel pitches different from each other are arranged at an image-forming surface of the imaging lens.

10 Claims, 2 Drawing Sheets

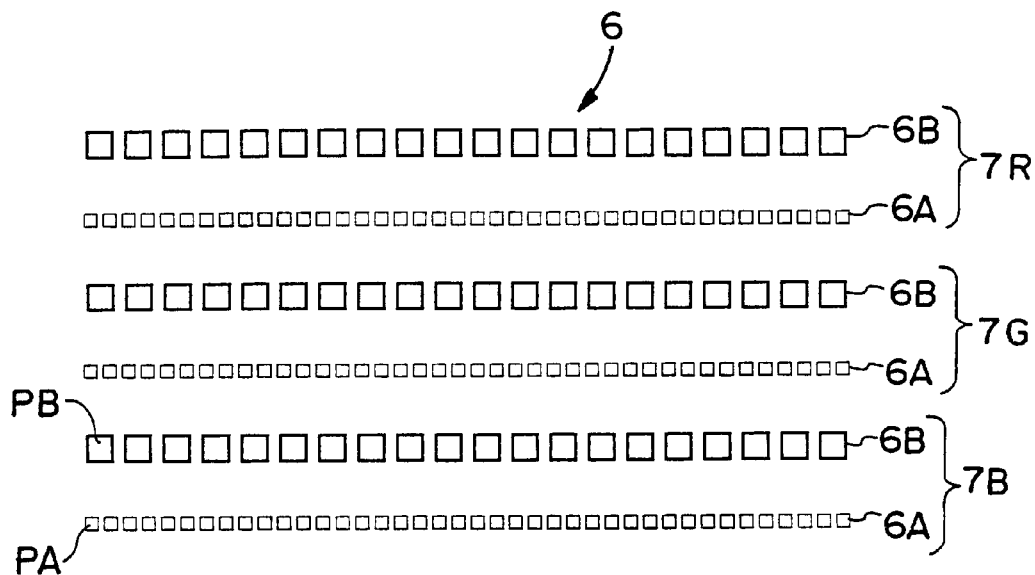
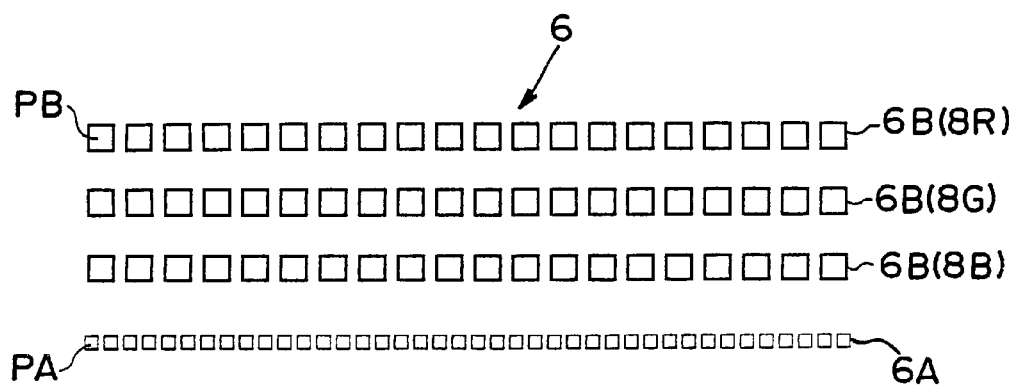

IMAGE READOUT APPARATUS AND IMAGE READOUT METHOD USING THE SAME

RELATED APPLICATIONS

This application claims the priority of Japanese Patent Application No. 2000-003571 filed on Jan. 12, 2000, which is incorporated herein by reference.

BACKGROUND OF THE INVENTION

1. Field of the Invention

The present invention relates to an image readout apparatus such as copier, facsimile machine, and image scanner, and an image readout method using this apparatus; and, more specifically, to an image readout apparatus comprising a plurality of rows of linear light-receiving devices, and an image readout method for reading out a color or monochrome image by using this image readout apparatus.

2. Description of the Prior Art

An image readout apparatus is an apparatus which illuminates an original with a light source, forms an image of the illuminated original onto a light-receiving device array through an imaging lens, and reads out thus formed image. Recently, there has been an increasing demand for changing the image readout resolution by use of a single image readout apparatus.

Conventionally, when the readout resolution of an image readout apparatus is to be changed, the imaging magnification of the imaging lens has been altered so as to change the size of the image formed on the same light-receiving device array, whereby the image readout resolution is made variable. Alternatively, while a light-receiving device array having a pixel pitch corresponding to the highest resolution in the image readout apparatus is used, processing for electrically reducing the number of pixels, for example, is carried out upon readout at a lower resolution.

In the former case of altering the imaging magnification of the imaging lens so as to change the image readout resolution, it is difficult for the imaging lens to be designed so as to yield favorable performances with a plurality of imaging magnifications, and the apparatus becomes larger and more expensive since the number of its constituent lenses increases. Also, since the conjugate length varies depending on the magnification, mechanical operations are necessary for absorbing this variation, whereby the apparatus becomes more expensive. For making the conjugate length constant, on the other hand, the imaging lens may be constituted by a zoom lens. However, the number of lens elements constituting the imaging lens further increases as a consequence, and the imaging lens enhances its size, whereby the apparatus becomes more expensive. Further, while the distance between the imaging lens and the light-receiving device array must be maintained with a high precision, this distance will be hard to maintain with a high precision if the imaging lens moves.

The latter case of changing the image readout resolution by carrying out electric processing, on the other hand, is structurally simple since it will be sufficient if high-resolution image information is electrically processed upon readout at a low resolution, whereby the cost will not rise greatly. In this case, however, image readout cannot be effected faster at a lower resolution, so that it takes the same amount of time as that at a higher resolution.

SUMMARY OF THE INVENTION

It is an object of the present invention to provide an image readout apparatus and image readout method which can change the image readout resolution without requiring complicated electric processing, while the distance between the imaging lens and light-receiving device array is maintained with a high precision.

The present invention provides an image readout apparatus comprising a light source for illuminating an original, a linearly arranged light-receiving device array, and an imaging lens for forming an image of the original illuminated with the light source onto the light-receiving device array;

wherein a plurality of light-receiving device arrays having respective pixel pitches different from each other are arranged at an image-forming surface of the imaging lens.

The resolution ratio between the different pixel pitches may be at least 2.

Three or more kinds of light-receiving device arrays having respective pixel pitches different from each other may be arranged.

Three or more rows of light-receiving device arrays with the same pixel pitch may be arranged, and the device arrays with the same pixel pitch may have sensitivities for respective wavelength regions different from each other.

Preferably, the light-receiving device comprises a linear Charge Coupled Device (CCD) image sensor.

The present invention provides an image readout method in which an original is illuminated with a light source, and an image of the illuminated original is formed onto a linearly arranged light-receiving device array through an imaging lens;

the method comprising the steps of:

arranging a plurality of light-receiving device arrays having respective pixel pitches different from each other; and reading out an image of the original formed on a light-receiving device array having a smaller pixel pitch upon readout at a higher resolution, and reading out an image of the original formed on a light-receiving device array having a greater pixel pitch upon readout at a lower resolution.

The image readout method may comprise the steps of arranging three or more rows of light-receiving devices having the same pixel pitch, and reading out respective wavelength regions different from each other with the device arrays having the same pixel pitch.

BRIEF DESCRIPTION OF THE DRAWINGS

FIG. 3 is a schematic diagram showing the arrangement of light-receiving device arrays in the image readout apparatus in accordance with a second embodiment of the present invention; and FIG. 4 is a schematic diagram showing the arrangement of light-receiving device arrays in the image readout apparatus in accordance with a third embodiment of the present invention.

DESCRIPTION OF THE PREFERRED EMBODIMENTS

In the following, embodiments of the present invention will be explained with reference to the drawings.

Figure 1:
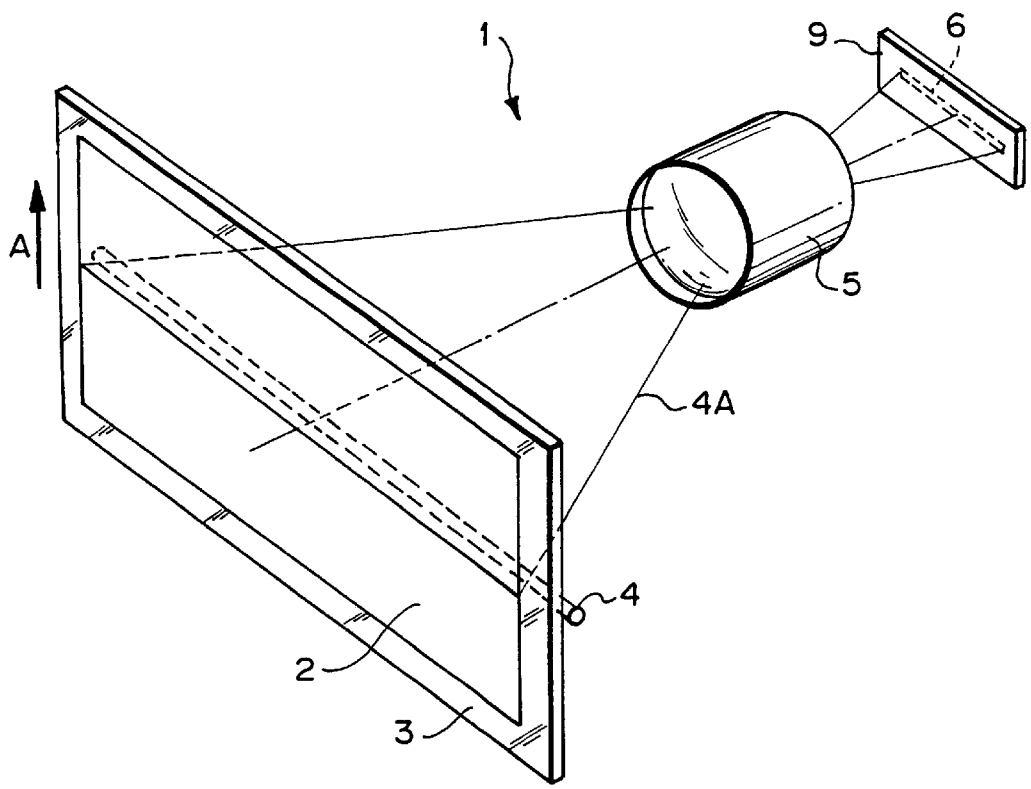
FIG. 1 is a schematic view showing the image readout apparatus in accordance with a first embodiment of the present invention.

FIG. 1 is a schematic view showing the image readout apparatus in accordance with a first embodiment of the present invention.

The image readout apparatus 1 of this embodiment is configured as a facsimile machine, image scanner, or the like, for example. The image readout apparatus 1 is constituted by a glass sheet 3 for mounting an original 2; an elongated light source 4, disposed close to the original 2 on the glass sheet 3, extending in a direction orthogonal to the sub-scanning direction (direction of arrow A); an imaging lens 5 for receiving and converging a luminous flux 4A reflected by the original 2 after being emitted from the light source 4; and a light-receiving device array 6 for reading out the image formed by the imaging lens 5; so as to be able to read out any of color and monochrome images.

Namely, the image readout apparatus 1 is an apparatus for illuminating the original 2 with the light source 4, forming an image of the illuminated original 2 onto the linearly arranged light-receiving device array 6, and reading out the image. As the light source 4, a white light source is employed, for example, so as to emit light having a wavelength characteristic extending over the whole visible light region. The movement in the sub-scanning direction may be effected by moving the original 2 in the sub-scanning direction or by use of a plurality of mirrors (not depicted) disposed between the original 2 and imaging lens 5. As the imaging lens 5, that of triplet, Gaussian, or ortho-meta type constituted by a plurality of lenses, for example, is employed. The luminous flux 4A incident on the imaging lens 5 along the optical axis from the object side (original side) forms an image on the light-receiving device array 6. As this imaging lens, one commonly used in a facsimile machine, image scanner, or the like may be used. The light-receiving device forming the linear light-receiving device array 6 is constituted by a linear CCD image sensor, for example. When a liner CCD image sensor is thus employed as the light-receiving device, the image readout apparatus of the present invention can inexpensively be constructed as a facsimile machine, image scanner, or the like.

Figure 2:
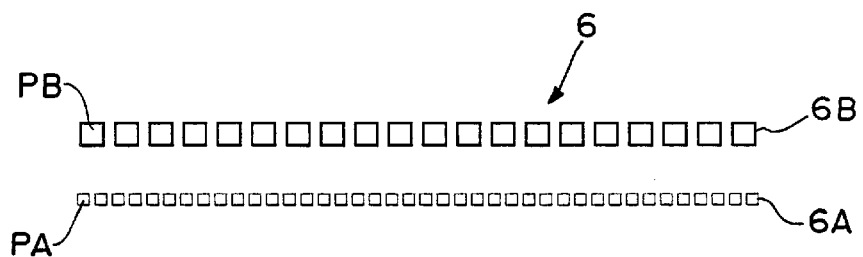
FIG. 2 is a schematic diagram showing a case where two kinds of light-receiving device arrays having their respective pixel pitches are arranged in the image readout apparatus in accordance with the first embodiment.

The light-receiving device array 6 is constructed as a plurality of light-receiving device arrays having respective pixel pitches different from each other. In the first embodiment, as shown in FIG. 2, it is constructed as two rows of light-receiving device arrays 6A, 6B having respective pixel pitches different from each other, for example, such that the pixel pitch PA of the light-receiving device array 6A differs from the pixel pitch PB of the other light-receiving device array 6B. The smaller pixel pitch PA of the light-receiving device array 6A located on the lower side in an imaging surface 9 is configured to have a resolution ratio of at least 2 with respect to the greater pixel pitch PB of the light-receiving device array 6B located on the upper side. If the resolution ratio between the smaller pixel pitch PA and the greater pixel pitch PB is set to 2 or greater as such, then it can respond to lower and higher resolutions.

The image readout method of the present invention is carried out by using the image readout apparatus 1 of the first embodiment as follows. Upon readout at a higher resolution, the image of original 2 formed on the light-receiving device array 6A having the smaller pixel pitch PA is read out. Upon readout at a lower resolution, on the other hand, the image of original 2 formed on the light-receiving device array 6B having the greater pixel pitch PB is read out. Since the two rows of light-receiving device arrays 6A, 6B having respective pixel pitches different from each other are thus used for reading out images at higher and lower resolutions, the image readout resolution can be changed while the distance between the imaging lens 5 and light-receiving device arrays 6A, 6B is maintained with a high precision without necessitating any complicated electric processing.

For faster readout, images of the original 2 may be formed on both of the light-receiving device array 6A having the smaller pixel pitch PA and the light-receiving device array 6B having the greater pixel pitch PB.

Though the two rows of light-receiving device arrays 6A, 6B are arranged at the imaging surface 9 of imaging lens 5 in the first embodiment, it is not restrictive, whereby three or more rows of light-receiving device arrays may be arranged. In this case, the pixel pitch of at least one row of light-receiving device array is configured so as to differ from that of the other light-receiving device arrays.

Though the two kinds of light-receiving device arrays 6A, 6B having respective pixel pitches PA, PB are arranged at the imaging surface 9 of imaging lens 5 in the first embodiment, it is not restrictive, whereby three or more light-receiving device arrays having respective pixel pitches different from each other may be arranged. If three or more light-receiving device arrays having respective pixel pitches different from each other are arranged as such, then the number of applicable levels of resolution can be made greater.

FIG. 3 is a schematic diagram showing the arrangement of light-receiving device arrays in the image readout apparatus in accordance with a second embodiment of the present invention. As with the image readout apparatus 1 of the first embodiment, the image readout apparatus of the second embodiment is an apparatus for illuminating the original 2 with the light source 4, forming an image of the illuminated original 2 onto the linearly arranged light-receiving device array 6, and reading out the image. The second embodiment differs from the first embodiment in the arrangement of light-receiving device array 6 in particular.

Namely, the light-receiving device array 6 in the second embodiment is configured such that three sets 7R, 7G, 7B each composed of the two rows of light-receiving device arrays 6A, 6B shown in FIG. 2 are arranged in rows from the upper side to the lower side, so that the individual sets 7R, 7G, 7B correspond to respective wavelength regions different from each other. Consequently, in the imaging surface of imaging lens 5, light-receiving device arrays 6A having the smaller pixel pitch PA and light-receiving device arrays 6B having the smaller pixel pitch PB are alternately arranged from the upper side to the lower side in three rows each. For example, the set 7R located on the upper side in the imaging surface of imaging lens 5 has a sensitivity for a red color wavelength region, the set 7G located in the middle has a sensitivity for a green color wavelength region, and the set 7B located on the lower side has a sensitivity for a blue color wavelength region. Thus, the image readout apparatus of the second embodiment is suitable for reading out color images in particular.

The image readout method of the present invention is carried out by using the image readout apparatus of the second embodiment as follows. When a color image is to be read out at a higher resolution, the light-receiving device arrays 6A having the smaller pixel pitch PA in the individual sets 7R, 7G, 7B are selected by the imaging lens 5, and the respective images of original 2 formed thereon are read out. When a color image is to be read out at a lower resolution, on the other hand, the light-receiving device arrays 6B having the greater pixel pitch PB in the individual sets 7R, 7G, 7B are selected, and the respective images of original 2 formed thereon are read out. Since the different pixel pitch PA (or PB) in each set 7R, 7G, 7B is selected, so as to read out a color image at a higher or lower resolution, the image readout resolution for the color image can be changed while the distance between the imaging lens 5 and light-receiving device arrays 6A, 6B is maintained with a high precision without necessitating any complicated electric processing.

For reading out a color image at a higher speed, images of the original 2 may be formed on both of the light-receiving device array 6A having the smaller pixel pitch PA and the light-receiving device array 6B having the smaller pixel pitch PB in each set 7R, 7G, 7B, so as to read out the color image. If the images of original 2 are formed on both of the light-receiving device arrays 6A, 6B having respective pixel pitches PA, PB in each set 7R, 7G, 7B, the color image can be read out faster due to the combined effects of both light-receiving device arrays 6A, 6B. Thus, three rows of the light-receiving device arrays 6A (or 6B) having the same pixel pitch PA (or PB) are arranged, so as to read out their respective different wavelength regions (red color wavelength region, green color wavelength region, and blue color wavelength region), whereby the second embodiment is adapted to read out not only monochrome images but also color images.

When reading out a monochrome image with the image readout apparatus of the second embodiment, the light-receiving device arrays 6B having the greater pixel pitch PB in the individual sets 7R, 7G, 7B may be selected, so as to read out the respective images of original 2 formed thereon. In this case, it will be sufficient if only luminance signals in the respective image signals obtained from the individual light-receiving device arrays are taken out and combined together.

Though two rows of light-receiving device arrays 6A, 6B are arranged in each set 7R, 7G, 7B in the imaging surface 9 of imaging lens 5 in the second embodiment, it is not restrictive, whereby three or more light-receiving device arrays may be arranged in each set 7R, 7G, 7B. In this case, the pixel pitch of at least one row of light-receiving device array is configured so as to differ from that of the other light-receiving device arrays.

Though the two kinds of light-receiving device arrays 6A, 6B having respective pixel pitches PA, PB are arranged in each set 7R, 7G, 7B in the second embodiment, it is not restrictive, whereby three or more light-receiving device arrays having respective pixel pitches different from each other may be arranged in each set 7R, 7G, 7B. If three or more light-receiving device arrays having respective pixel pitches different from each other are arranged as such, then the number of applicable levels of resolution in color images can be made greater.

FIG. 4 is a schematic diagram showing the arrangement of light-receiving device arrays in the image readout apparatus in accordance with a third embodiment of the present invention. As with the image readout apparatus of the first and second embodiments, the image readout apparatus of the third embodiment is an apparatus for illuminating the original 2 with the light source 4, forming an image of the illuminated original 2 onto the linearly arranged light-receiving device array 6, and reading out the image. The third embodiment differs from the first and second embodiments in the arrangement of light-receiving device array 6 in particular.

Namely, in the light-receiving device array 6 in the third embodiment, one row of light-receiving device array 6A having a smaller pixel pitch PA and three rows of light-receiving device arrays 6B each having a greater pixel pitch PB are arranged at an imaging surface of the imaging lens 5, whereas individual rows 8R, 8G, 8B of the three rows of light-receiving device arrays 6B correspond to respective wavelength regions different from each other. The single row of light-receiving device array 6A is adapted to read out monochrome images. In the three rows of light-receiving device arrays 6B, on the other hand, the row 8R located on the upper side in the imaging surface of imaging lens 5 corresponds to a red color wavelength region, the row 8G located in the middle corresponds to a green color wavelength region, and the row 8B located on the lower side corresponds to a blue color wavelength region, for example. Thus, the image readout apparatus of the third embodiment is adapted to read out monochrome and color images.

The image readout method of the present invention is carried out by using the image readout apparatus of the third embodiment as follows. When a monochrome image is to be read out, the image of original 2 formed on the light-receiving device array 6A having the smaller pixel pitch PA by the imaging lens 5 is read out. When a color image is to be read out, on the other hand, the image of original 2 formed on the light-receiving device array 6B (each row 8R, 8G, 8B) having the greater pixel pitch PB by the imaging lens 5 is read out. Hence, the image of original 2 formed on the light-receiving device array 6A having the smaller pixel pitch is read out at a higher resolution when reading out a monochrome image having a smaller amount of information, whereas the image of original 2 formed on the light-receiving device array 6B (each row 8R, 8G, 8B) having the greater pixel pitch PB is read out at a lower resolution when reading out a color image having a greater amount of information. Since the light-receiving device arrays 6A, 6B for performing readout are thus selected so as to read out monochrome and color images at their respective appropriate resolutions, the apparatus is adapted to read out monochrome and color images and respond to changes in resolution while maintaining the distance between the imaging lens 5 and light-receiving device arrays 6A, 6B with a high precision without necessitating any complicated electric processing.

Though one row of light-receiving device array 6A adapted to read out monochrome images and three rows of light-receiving device arrays 6B (for respective rows 8R, 8G, 8B) adapted to read out color images are arranged in the imaging surface 9 of imaging lens 5 in the third embodiment, it is not restrictive, whereby two or more rows of light-receiving device arrays adapted to read out monochrome images and two or more rows of light-receiving device arrays adapted to read out color images for each row 8R, 8G, 8B may also be arranged. In this case, the pixel pitch of at least one row of light-receiving device array is configured so as to differ from that of the other light-receiving device arrays for each of the monochrome and color images.

Though the two kinds of light-receiving device arrays 6A, 6B having respective pixel pitches PA, PB are arranged in the imaging surface 9 of imaging lens 5 in the third embodiment, it is not restrictive, whereby three or more light-receiving device arrays having respective pixel pitches different from each other may be arranged. If three or more light-receiving device arrays having respective pixel pitches different from each other are arranged as such, then the number of applicable levels of resolution in monochrome and color images can be made greater.

As explained in the foregoing, since a plurality of light-receiving device arrays having pixel pitches different from each other are arranged, the present invention can change the image readout resolution while maintaining the distance between the imaging lens and light-receiving device arrays with a high precision without necessitating any complicated electric processing.

Namely, since the pixel pitch of at least one row of light-receiving device array in the plurality of light-receiving device arrays is configured so as to differ from that of the other light-receiving device arrays, the image readout resolution can be changed, so that a light-receiving device array having a smaller pixel pitch is used for readout at a higher resolution, whereas a light-receiving device array having a greater pixel pitch is used for readout at a low resolution so as to enable faster readout.

If the resolution ratio between the different pixel pitches is configured to become at least 2, then it can respond to lower and higher resolutions used in practice.

If three or more kinds of light-receiving device arrays having respective pixel pitches different from each other are arranged, then the number of applicable levels of resolution can be made greater.

If three or more rows of light-receiving device arrays having the same pixel pitch are arranged so as to correspond to respective wavelength regions different from each other, they can read out not only monochrome images but also color images.

If a linear CCD image sensor is employed as a light-receiving device, the image readout apparatus of the present invention can inexpensively be constructed as a facsimile or image scanner.

What is claimed is:

1. An image readout apparatus comprising a light source for illuminating an original, a linearly arranged light-receiving device array, and an imaging lens for forming an image of said original illuminated with said light source onto said light-receiving device array;

wherein a plurality of light-receiving device arrays having substantially the same length and having respective pixel pitches different from each other are arranged at an image-forming surface of said imaging lens;

wherein at least three rows of light-receiving device arrays with the same pixel pitch are arranged, said device arrays with the same pixel pitch having sensitivities for respective wavelength regions different from each other.

2. An image readout apparatus according to claim 1, wherein the resolution ratio between said different pixel pitches is at least 2.

3. An image readout apparatus according to claim 1, wherein at least three kinds of light-receiving device arrays having respective pixel pitches different from each other are arranged.

4. An image readout apparatus according to claim 1, wherein said light-receiving device comprises a linear CCD image sensor.

5. An image readout method in which an original is illuminated with a light source, and an image of the illuminated original is formed onto a linearly arranged light-receiving device array through an imaging lens;

said method comprising the steps of:
arranging a plurality of light-receiving device arrays having substantially the same length and having respective pixel pitches different from each other; and reading out an image of said original formed on a light-receiving device array having a smaller pixel pitch upon readout at a higher resolution, and reading out an image of said original formed on a light-receiving device array having a greater pixel pitch upon readout at a lower resolution;

comprising the steps of arranging at least three rows of light-receiving devices having the same pixel pitch, and reading out respective wavelength regions different from each other with said device arrays having the same pixel pitch.

6. An image readout apparatus comprising a light source for illuminating an original, a linearly arranged light-receiving device array, and an imaging lens for forming an image of said original illuminated with said light source onto said light-receiving device array;

wherein a plurality of light-receiving device arrays having respective pixel pitches different from each other are arranged at an image-forming surface of said imaging lens;

wherein at least three rows of light-receiving device arrays corresponding to different color wavelength regions with the same pixel pitch are arranged, said device arrays with the same pixel pitch having sensitivities for respective wavelength regions different from each other; and wherein outputs from said at least three rows of light-receiving device arrays are combined together to produce a monochrome image.

7. An image readout method in which an original is illuminated with a light source, and an image of the illuminated original is formed onto a linearly arranged light-receiving device array through an imaging lens;

said method comprising the steps of:
arranging a plurality of light-receiving device arrays having respective pixel pitches different from each other; and reading out an image of said original formed on a light-receiving device array having a smaller pixel pitch upon readout at a higher resolution, and reading out an image of said original formed on a light-receiving device array having a greater pixel pitch upon readout at a lower resolution, comprising the steps of arranging at least three rows of light-receiving devices corresponding to different color wavelength regions having the same pixel pitch, and reading out respective wavelength regions different from each other with said device arrays having the same pixel pitch; and combining together outputs of said at least three rows of light-receiving devices to produce a monochrome image.

8. An image readout apparatus comprising a light source for illuminating an original, a linearly arranged light-receiving device array, and an imaging lens for forming an image of said original illuminated with said light source onto said light-receiving device array;

wherein a plurality of light-receiving device arrays having respective pixel pitches different from each other are arranged at an image-forming surface of said imaging lens;

wherein at least three rows of light-receiving device arrays with the same pixel pitch are arranged, said three rows of device arrays with the same pixel pitch having sensitivities for respective wavelength regions different from each other, which correspond to different color wavelength regions, and at least one row of lightreceiving arrays is used for reading monochrome images.

9. An image readout apparatus according to claim 8, wherein said at least one row of lightreceiving arrays used for reading monochrome images has a smaller pixel pitch than the at least three rows of lightreceiving arrays which correspond to different color wavelength regions.

10. An image readout method in which an original is illuminated with a light source, and an image of the illuminated original is formed onto a linearly arranged lightreceiving device array through an imaging lens;

said method comprising the steps of:

arranging a plurality of light-receiving device arrays having respective pixel pitches different from each other; and reading out a monochrome image of said original formed on a light-receiving device array having a smaller pixel pitch upon readout at a higher resolution, and reading out a color image of said original formed on at least three rows of lightreceiving device arrays having a greater pixel pitch upon readout at a lower resolution.

* * * * *

UNITED STATES PATENT AND TRADEMARK OFFICE
CERTIFICATE OF CORRECTION

PATENT NO. : 6,593,559 B2
DATED : July 15, 2003
INVENTOR(S) : Hiromitsu Yamakawa It is certified that error appears in the above-identified patent and that said Letters Patent is hereby corrected as shown below:

<u>Column 9,</u>
Lines 7, 10 and 12, delete the word "lightreceiving" and substitute therefore
-- light-receiving --.

<u>Column 10,</u>
Lines 1-2, delete the word "lightreceiving" and substitute therefore
-- light-receiving --.
Lines 11-12, delete the word "lightreceiving" and substitute therefore
-- light-receiving --.

Signed and Sealed this

Thirtieth Day of September, 2003

JAMES E. ROGAN
*Director of the United States Patent and Trademark Office*